United States Patent [19]

Smith et al.

[11] 4,003,868
[45] Jan. 18, 1977

[54] INK OR COATING COMPOSITIONS OF LOW VOLATILITY

[75] Inventors: Oliver Wendell Smith, South Charleston; Charles Hobert Carder, Charleston, both of W. Va.; David John Trecker, Old Lyme, Conn.

[73] Assignee: Union Carbide Corporation, New York, N.Y.

[22] Filed: Apr. 25, 1975

[21] Appl. No.: 571,786

Related U.S. Application Data

[63] Continuation-in-part of Ser. No. 205,855, Dec. 8, 1971, Pat. No. 3,935,330.

[52] U.S. Cl. .............................. 260/21; 204/159.16; 204/159.21; 260/23 AR; 260/23 EP; 260/851; 260/856

[51] Int. Cl.² ........................ C09D 3/52; C09D 3/58; C09D 3/81

[58] Field of Search .............. 260/21, 23 AR, 23 EP, 260/851, 856; 204/159.16, 159.21

[56] References Cited

UNITED STATES PATENTS

| | | | |
|---|---|---|---|
| 2,545,450 | 3/1951 | Dalton et al. | 427/45 |
| 3,137,674 | 6/1964 | Marans et al. | 260/877 |
| 3,450,613 | 6/1969 | Steinberg | 204/159.15 |
| 3,520,714 | 7/1970 | Miller | 204/159.15 |
| 3,535,148 | 10/1970 | Ravve | 260/849 |
| 3,551,311 | 12/1970 | Nass et al. | 260/836 |
| 3,558,387 | 1/1971 | Bassemir et al. | 204/159.15 |
| 3,625,744 | 12/1971 | Juna et al. | 204/159.24 |
| 3,669,796 | 6/1972 | Hall et al. | 156/272 |
| 3,676,192 | 7/1972 | Hahn | 260/884 |
| 3,740,287 | 6/1973 | Milne | 427/55 |
| 3,772,062 | 11/1973 | Shur | 428/413 |
| 3,776,729 | 12/1973 | Levy et al. | 204/159.15 |
| 3,878,077 | 4/1975 | Borden et al. | 204/159.16 |

FOREIGN PATENTS OR APPLICATIONS 246,320  6/1969  U.S.S.R. ........................ 96/115 P

*Primary Examiner*—Ronald W. Griffin
*Attorney, Agent, or Firm*—Francis M. Fazio

[57] ABSTRACT

Liquid ink or coating compositions that can be cured by thermal treatment or by a combination of ionizing or non-ionizing radiation and a thermal treatment are disclosed. The components are all essentially non-volatile during cure and the compositions have high viscosities making them eminently suitable for printing applications.

10 Claims, No Drawings

INK OR COATING COMPOSITIONS OF LOW VOLATILITY

This application is a continuation-in-part of application Ser. No. 205,855, filed Dec. 8, 1971, now U.S. Pat. No. 3,935,330, issued Jan. 27, 1976.

BACKGROUND OF THE INVENTION

The ink and coating industry is faced with the problems of reducing volatile emissions necessitated by the state and federal regulations being enacted to control the effluents allowed to escape into the atmosphere. This has prompted considerable reformulation and one of the routes being taken is the replacement of all or essentially all of the volatile solvents in a coating or ink composition with reactive components that become a part of the cured composition. These compositions have become known in the art as 100 percent reactive compositions. Many of these compositions may be cured by thermal polymerization on the coated substrate, and many can be cured by irradiation with ionizing or non-ionizing energy.

In the past many difficulties have been observed in producing radiation curable, high solids ink or coating compositions that produce finished products having good hardness and toughness together with satisfactory adhesion.

SUMMARY OF THE INVENTION

The present invention is concerned with a limited group of ink and coating compositions having extremely low volatility that can be applied by conventional means and that can be readily cured by a dual mechanism that is initialed by heat or by a combination of heat and radiation that can be ionizing or non-ionizing radiation. The compositions of this invention are liquid formulations of high viscosity and low volatility that contain an aminoplast resin, such as, a melamine/-formaldehyde resin or urea/formaldehyde resin, an acrylate or methacrylate ester of an epoxidized fatty oil containing hydroxyl groups vicinal to the acrylate or methacrylate groups, and a different hydroxyl-containing polyacrylate ester or polymethacrylate ester having an average of more than one functional acrylate or methacrylate group in the molecule. These compositions can be subsequently cured by radiation, and as indicated, this radiation can be ionizing or non-ionizing. The ionizing radiation source can be any of the conventional electron beam or electron generating sources, as will be briefly discussed hereafter. The non-ionizing radiation source can be mercury arcs, xenon arcs, swirl-flow plasma arcs, or any other source used in the generation of ultraviolet light radiation. The thermal curing step can be carried out in a conventional heating oven employing any suitable means for heat generation.

DESCRIPTION OF THE INVENTION

One of the major problems encountered in the printing and coating industry in the past has been the volatilization of the volatile reactants or unreactive components present in the ink or coating compositions as they are cured by thermal means after application to the substrate or surface. This has led to air pollution problems and in some instances has resulted in deficiencies in the final cured product itself. Another problem has been the inability to obtain high-solids inks of proper viscosity for use in conventional printing equipment, such as litho inks.

The compositions of this invention contain from about 5 to about 35 weight percent, preferably from 10 to 25 weight percent, of the aminoplast resin, or the melamine/formaldehyde resin or urea/formaldehyde resin. These resins are well known and many are commercially available and therefore require no further description to one skilled in the art.

Another component of the compositions of this invention is an acrylate or methacrylate ester of an epoxidized fatty oil. These acrylyl esters are well known and are produced by the reaction of an epoxidized fatty oil, such as cottonseed oil, corn oil, soybean oil, oiticica oil, tung oil, linseed oil, perilla oil, castor oil, hempseed oil, safflower oil, peanut oil, olive oil, or any other epoxidized unsaturated fatty oil, with acrylic or methacrylic acid to obtain the acrylate or methacrylate ester having hydroxyl groups vicinal to the acrylyl group. In this application, the term acrylyl is used to define both the acryloxy and methacryloxy groups. These compounds and methods for their production are known and are described in U.S. Pat. No. 3,125,592 (issued Mar. 17, 1964) and U.S. Pat. No. 3,224,989 (issued Dec. 21, 1965). These polyacrylate or polymethacrylate esters of the epoxidized fatty oils are essentially monomeric with some low molecular weight oligomers present that are formed during the ester-forming reaction between the acrylyl acid and the epoxidized fatty oil. The compounds have hydroxyl groups vicinal to the acrylate or methacrylate groups and have an average of at least two acrylate or methacrylate groups per mole; preferably from about 2.5 to about 5.5 of said groups per mole. This component is present in the coating or ink compositions of this invention at a concentration of from about 40 to about 90 weight percent, preferably from 50 to 80 weight percent.

The third component present in the compositions of this invention is a different hydroxyl-containing polyacrylate or polymethacrylate ester having an average of more than one functional acrylate or methacrylate groups in the molecule, preferably from about 2 to about 4 of said groups per molecule. These esters are well known to those skilled in the art and include glycerol diacrylate, glycerol dimethacrylate, trimethylolpropane diacrylate, trimethylolpropane dimethacrylate, pentaerythritol diacrylate, pentaerythritol triacrylate, pentaerythritol dimethacrylate, pentaerythritol trimethacrylate, dipentaerythritol tetraacrylate, dipentaerythritol tetramethacrylate, the diacrylate or dimethacrylate esters of the polycaprolactone triols or higher polyols, the diacrylate or dimethacrylate esters of the polyether triols or higher polyols, and any of the other known acrylate and methacrylate esters having the defined functionality, and mixtures thereof. Of particular interest is the mixture obtained by the esterification of pentaerythritol with acrylic acid; this mixture having an average of from 2.8 to 3.8 acrylate groups per mole of pentaerythritol. This component is present in the composition at a concentration of from about 5 to about 55 weight percent, preferably from 10 to 40 weight percent.

One can also use mixtures of two or more of any of each of the three classes of components defined above in producing the compositions. The components are essentially non-volatile and the presence of any significant quantity of volatile, air-polluting materials is to be avoided. The coating or ink compositions have a viscosity of at least W on the Gardner-Holdt Scale and preferably have a Gardner-Holdt viscosity of Z or greater.

The coating or ink compositions of this invention are cured on the substrate by a dual-mechanism which can be initiated by either thermal curing or by a combination of radiation plus thermal curing. Thermal curing of the composition entails the passage of the printed or coated object containing the coating or ink composition through a heating zone for the thermal cure. The heating zone may be a gas-fired oven and operate by convection currents, but others means may be employed with equal effectiveness, such as, microwave, induction coil, infrared and open flame heating ovens. As indicated above, thermal energy may be applied by heat radiation, convection or conduction; this step requires temperatures in the range of 50° to 250° C., or higher. So-called forced-air curing, often used for wood and cellulosic substrates, is normally operated in the range of 70°–100° C. True baking ovens, often employed with metal substrates, function between 150°–200° C. Residence time varies widely depending upon the temperature used, the composition of the coating or ink or the substrate, and the ultimate properties sought; it can range from as little as 5 seconds to as much as 30 minutes. Heating cycles on some printing and coil coating lines may range from a fraction of a second up to 5 to 20 seconds, whereas the thermal setting of some coatings on home appliances may range from 20 to 30 minutes or more.

It is understood, of course, that the pre-treatment and/or printing of metal substrates and the filling and/or priming of wood substrates may precede the application of the coating compositions of this invention to the substrate. Similarly, in printing applications, the substrate can be pretreated in any conventional manner prior to printing thereon with the ink compositions of this invention.

As indicated, the compositions of this invention can also be cured by a combination of thermal and radiation means. In employing such procedure, one can initially expose the applied composition to thermal cure and then to radiation cure, or these procedural steps can be reversed. Any of the radiation curing methods can be used and those skilled in the art are fully cognizant of the non-ionizing and ionizing radiation procedures used in the coating and printing industries for curing coatings or ink compositions.

Among the ionizing radiation means known are particulate and non-particulate radiation. Particulate radiation is that which can be generated from electron accelerators such as the Van de Graaff, resonance transformers, linear accelerators, insulated core transformers, radioactive elements such as cobalt 60, strontium 90, etc. As a suitable source of non-particulate ionizing radiation, one can use any source which emits radiation in the range of from about $10^{-3}$ Angstrom to about 2,000 Angstroms, preferably from about $5 \times 10^{-3}$ Angstrom to about 1 Angstrom. Suitable sources are vacuum ultraviolet lamps, such as xenon or krypton arcs, and radioactive elements such as cesium-137, strontium-90, and cobalt 60. The nuclear reactors are also known to be a useful source of ionizing radiation.

The ionizing radiation dosage necessary to effect the cure will vary depending upon the particular composition that is undergoing radiation, the extent of curing desired, the number of curable sites available, the molecular weight of the starting polymer, and the quantity of composition undergoing treatment. The total dosage will vary from about $10^3$ rads to $10^8$ rads, preferably from $5 \times 10^3$ rads to $10^7$ rads. A rad is 100 ergs of ionizing energy absorbed per gram of material being irradiated.

As a suitable source of non-ionizing radiation one can use any source which emits actinic light radiation of from about 2,000 Angstroms to about 4,500 Angstroms, preferably from about 2,500 Angstroms to about 4,000 Angstroms. Suitable sources of actinic light radiation are mercury arcs, carbon arcs, tungsten filament lamps, xenon arcs, krypton arcs, sunlamps, lasers, and the like. All of these devices and sources are well known in the art and those familiar with the technology are fully aware of the manner in which the radiation is generated and the precautions to be exercised in its use. A particularly useful non-ionizing curing procedure is that employing ultraviolet light radiation of 2,537 Angstroms, as is disclosed in U.S. Pat. No. 3,840,448 (issued Oct. 8, 1974).

To catalyze the dual-mechanism cure of the compositions of this invention, both free radical initiators and condensation catalysts can be used. When both polymerization mechanisms are initiated by a thermal treatment, a strong acid catalyst may be used to facilitate the condensation reaction (the reaction between the aminoplast resin and the hydroxyl groups of the other compounds), but the free radical polymerization of the unsaturated acrylyl radicals will proceed at elevated temperatures even without added catalyst, though a free radical initiator could be added if desired. When the free radical polymerization of the unsaturated acrylyl groups is to be initiated by exposure to actinic light radiation, any of the photo-initiators known to those skilled in the art can be employed.

As catalyst for the thermally initiated condensation reaction one can use any of the strong acid catalysts, e.g., p-toluenesulfonic acid, known to those skilled in the art, as well as the salts of these acids in conjunction with volatile amines. The concentration of acid catalyst can range from about 0.1 to 10 weight percent, preferably from 0.5 to 5 weight percent, of the composition; any catalytic amount can be used. If a free radical initiator is also added the amount thereof can be any catalytic amount sufficient for the initiation of the free radical polymerization reaction. These amounts are known to those skilled in the art, as are the identities of the free radical initiators.

When the compositions are also exposed to a source of non-ionizing radiation a photoinitiator is preferably added to enhance the reaction. As is obvious, one can use one or more of the photoinitiators and they can be used in conjunction with one or more of the condensation catalysts or free free radical initiators. When used, the amount of photoinitiator added can be varied from about 0.01 to about 20 weight percent, preferably from about 0.1 to about 10 weight percent, and more preferably from about 0.5 to about 5 weight percent. Illustrative of suitable photoinitiators or photosensitizers one can mention acetophenone, propiophenone, benzophenone, xanthone, fluorenone, benzaldehyde, fluorene, anthraquinone, triphenylamine, carbazole, 3- or 4-methylacetophenone, 3- or 4-pentylacetophenone, 3- or 4-methoxyacetophenone, 2,2-diethoxyacetophenone, 3- or 4-bromoacetophenone, 3- or 4-allylacetophenone, p-diacetylbenzene, 3- or 4-methoxybenzophenone, 3- or 4-methylbenzophenone, 3- or 4-chlorobenzophenone, 4,4′-dimethoxybenzophenone, 4-chloro-4'-benzylbenzophenone, 3-chloroxanthone, 3,9-dichloroxanthone, 3-chloro-8-nonylxanthone, 3-methoxyxanthone, 3-iodo-7-methoxyxanthone, and the like.

The ink or coating compositions of this invention can also contain a small amount of other polymers, though the preferred compositions are those that do not. Such polymers can be present at concentrations up to about 20 weight percent. Illustrative of useful polymers one can include the olefin polymers and copolymers such as polyethylene, polypropylene, polyisobutene, polybutene, poly(ethylene/propylene), poly(ethylene/butene), poly(ethylene/butadiene), poly(ethylene/norbornadiene), poly(ethylene/propylene/norbornadiene), poly(ethylene/propylene/5-methylenebicyclo[2.2.1]hept-2-ene), poly(ethylene/propylene/5-ethylidenebicyclo[2.2.1]hept-2-ene), poly(ethylene/vinyl acetate), poly(ethylene/vinyl chloride), poly(ethylene/ethyl acrylate), poly(ethylene/acrylonitrile), poly(ethylene/acrylic acid), poly(ethylene/styrene), poly(ethylene/vinyl ethyl ether), poly(ethylene/vinyl methyl ketone), polybutadiene, polyisoprene, polychloroprene, polycyclopentadiene, poly-1,5-hexadiene, poly(butadiene/isoprene), poly(butadiene/vinyl chloride), poly(butadiene/dimethyl butadiene), poly(butadiene/chloroprene), poly(isoprene/isobutylene), poly(butadiene/isobutylene), poly(butadiene/styrene), poly(butadiene/acrylonitrile), poly(butadiene/styrene/acrylonitrile), poly(butadiene/methyl methacrylate), poly(butadiene/butyl acrylate), poly(butadiene/vinyl chloride), poly-(isoprene/styrene), poly(isoprene/2-vinyl pyridine), and the like. The olefin polymers are well known and any such polymer can be used. Also suitable are the vinyl and vinylidene polymers such as poly(vinyl chloride), poly(vinyl bromide), poly(vinylidene chloride), poly-(vinyl acetate), poly(vinyl methyl ether), poly(vinyl butyl ether), poly(vinyl methyl ketone), poly(vinyl alcohol, poly(allyl alcohol), polyindene, poly(vinylpyridine), poly(vinylpyrrolidone), poly(vinyl butyral), poly(vinyl chloride), poly(vinyl sulfonic acid), polystyrene, poly-(α-methylstyrene), poly(4-chlorostyrene), poly(4-vinyl bisphenyl), poly(9-vinyl anthracene), poly(N-vinylcarbazole), poly(N-vinyl-1,2,4-triazole), and the like. Further suitable polymers are the acrylic polymers such as poly(acrylic acid), poly(methyl acrylate), poly(ethyl acrylate), polyacrylonitrile, polyacrylamide, polyacrolein, poly(methacrylic acid), poly(methyl methacrylate), poly(ethyl methacrylate), polymethacrylonitrile, poly(N,N-dimethyl acrylamide), poly(methacrylamide), poly(9-acrylylcarbazole, poly(α-methacrolein), poly(diacrylalmethane), poly(acrylic anhydride), poly(methacrylic anhydride), and the like. In addition, the polyesters and polyamides such as polycaprolactone, poly(caprolactone/vinyl chloride), poly-(ethylene glycol terephthalate), poly(hexamethylene succinate), poly(hexamethylene maleate), poly(hexamethylene carbonate), poly(caprolactam), poly(hexamethylene adipamide), and the like, are useful. The polyethers such as poly(glutardialdehyde), polyethylene oxide, polypropylene oxide, poly(tetrahydrofuran), polycyclohexene oxide, copolymers of ethylene oxide and propylene oxide with starters containing reactive hydrogen atoms such as the mixed copolymer using ethylene glycol, glycerol, sucrose, etc., as the starter. Also suitable are the known polyureas and polyurethanes as described in "Polyurethanes: Chemistry and Technology", Volumes I and II, Saunders and Frisch, published by Interscience Publishers, as well as the natural and modified natural polymers such as gutta percha, cellulose, methyl cellulose, starch, silk, wool, and the like, and the siloxane polymers and copolymers. The polysulfides and polysulfones such as poly(thiocarboxyl fluoride), poly(ethylene dichloride-co-sodium tetrasulfide), poly(ethylene sulfide), poly(ethylene sulfone), poly-(styrene sulfone), poly(1-pentyne sulfone), poly(butadiene sulfone), poly(isoprene sulfone), and the like. The formaldehyde polymers such as polyformaldehyde, formaldehyde resins such as phenolformaldehyde, melamine-formaldehyde, urea-formaldehyde, aniline-formaldehyde and acetone-formaldehyde, and the like. The heterocyclic polymers such as poly(benzimidazoles), poly(alkylene-5,5'-dibenzimidazoles), poly(arylene-5,5'-benzimidazoles), poly(pyromellitimides), poly-(benzoxazoles), poly(oxadiazoles), poly(dithiazoles), poly(benzothiazoles), poly(piperazines), poly(quinoxalines), and the like.

The inclusion of pigments, fillers, wetting agents, flatting agents, leveling agents, and other additives typically present in ink and coating formulations at their accepted concentrations is also contemplated. These additives and the concentrations at which they are used are well known to those skilled in the art and do not require further discussion here.

The compositions are produced by mixing the components together using conventional ink and coating manufacturing equipment. When applied to the substrate the curing is carried out under atmospheric conditions, or, if desired, under an inert gas atmosphere, using nitrogen, argon, carbon dioxide, or other inert gas, to blanket the surface.

The following examples serve to illustrate the invention; parts and percentages are by weight unless otherwise indicated.

EXAMPLE 1

A highly viscous, low volatility, high solids ink composition was prepared by admixing 60 parts of the acrylate ester of epoxidized linseed oil having an average of about 2.6 acrylate groups per 1,000 molecular weight units, 10 parts of hexamethoxymethyl melamine, 30 parts of pentaerythritol triacrylate and 2 parts of a dilute solution of p-toluenesulfonic acid as catalyst. This composition was a thick viscous fluid having a Z5 to Z6 Gardner-Holdt viscosity. The ink was applied at a thickness of 0.7 mil to a steel plate using a wirewound rod and cured at 350° F. for 20 minutes in a forced air oven. The cured ink had a Sward hardness of 42, cross-hatch adhesion of 100 percent, an acetone resistance greater than 300 seconds, and a Taber wear value of 6.7 mg. loss per 100 cycles using a CS-17 abrasive wheel bearing a 1,000 gram weight. Sward hardness was compared to glass, given a value of 100, as described on pages 164 to 166 of "Physical And Chemical Examination Of Paints, Varnishes, Lacquers, And Colors", 11th Edition, Gardner Laboratory, Bethesda, Md. Cross-hatch adhesion is a measure of the percentage of composition remaining after a tape pull (Scotch No. 610) on a grid of razor blade cuts, 10 in each direction, one-eighth inch apart. Acetone resistance is determined by placing a swatch of cotton or absorbent paper saturated with acetone on the cured composition and measuring the time in seconds required for the cured composition to be lifted off the substrate. During the test the cotton or paper is kept saturated with acetone by the further addition of small amounts with a dropper.

A similar composition was prepared for control comparisons omitting the hexamethoxymethyl melamine and using 65 parts of the acrylated epoxidized linseed oil and 35 parts of the pentaerythritol triacrylate. A 2.6 mils thick layer cured in the same manner had a Sward hardness of only 29 and a Taber wear value of 10. Though this control also had a Z5 to Z6 viscosity, it illustrates the importance of the need for the presence of all three major components in the composition.

Similar curing results are obtained using a hand rubber stamp to apply the inks to a cellulosic substrate.

EXAMPLE 2

A highly viscous, low volatility, high solids ink composition was prepared by admixing 60 parts of the acrylate ester of epoxidized linseed oil having an average of about 2.6 acrylate groups per 1,000 molecular weight units, 10 parts of hexamethoxymethyl melamine, 30 parts of pentaerythritol triacrylate, 2 parts of a dilute solution of p-toluenesulfonic acid and 1 part of 2,2-diethoxyacetophenone. This ink had a Z5 to Z6 Gardner-Holdt viscosity. This composition was applied and cured as described in Example 1 (Composition 2A; Treatment I).

In addition, a control composition was produced, as described for the control of Example 1, in which the hexamethoxymethyl melamine was omitted (Composition 2B). This control composition and the composition of this invention described in the preceding paragraph were cured by initially exposing the applied inks to non-ionizing radiation and then thermally curing under the same conditions described in Example 1 (Treatment II). The exposure to non-ionizing radiation was for 3 seconds in air to ultraviolet radiation from medium pressure mercury lamps (500 watts per square foot) followed by exposure for 3 seconds under nitrogen to ultraviolet radiation of 2,537 Angstroms (1 watt per square foot). The cured inks had the following properties:

| Composition | 2A | 2A | 2B |
|---|---|---|---|
| Treatment | I | II | II |
| Thickness, mills | 1.0 | 1.7 | 20 |
| Sward hardness | 40 | 40 | 32 |
| Cross-hatch adhesion, % | 100 | 100 | 100 |
| Acetone resistance, sec. | >300 | >300 | >300 |
| Taber wear value | 5.5 | 2.2 | 8.3 |

The lower Sward hardness and higher Taber wear values, indicative of poorer properties, in the absence of the hexamethoxymethyl melamine are self-evident.

EXAMPLE 3

A high solids ink composition was produced by admixing 55 parts of the acrylate ester of epoxidized linseed oil having an average of about 2.6 acrylate groups per 1,000 molecular weight units, 20 parts of of hexamethoxymethyl melamine, 25 parts of pentaerythritol acrylate and 2 parts of a dilute solution of p-toluenesulfonic acid. The composition had a Gardner-Holdt viscosity of Z5 to Z6. A 1.1 mils thick layer on a steel panel substrate was cured in a forced air oven for 20 minutes at 350° F. It had a Sward hardness of 48, cross-hatch adhesion of 100 percent, acetone resistance of more than 300 seconds and a Taber wear value of 6.7 mgm. loss per 100 cycles.

Similar results are obtained by substituting a urea-formaldehyde resin for the hexamethoxymethyl melamine used in the above composition.

EXAMPLE 4

A high solids ink composition was produced by admixing 60 parts of the acrylate ester of epoxidized soybean oil having an average of about 2.6 acrylate groups per 1,000 molecular weight units, 10 parts of hexamethoxymethyl melamine, 30 parts of pentaerythritol triacrylate and 2 parts of a dilute solution of p-toluenesulfonic acid. The composition had a Gardner-Holdt viscosity of Z3. A 0.9 mil thick layer on a steel panel substrate was cured in a forced air oven for 20 minutes at 350° F. It had a Sward hardness of 28, cross-hatch adhesion of 100 percent, acetone resistance of more than 300 seconds, and a Taber wear value of 16.1 mgm. loss per 100 cycles.

What is claimed is:

1. A liquid or paste composition comprising:
   I. — from 5 to 35 weight percent of a melamine/formaldehyde resin or urea/formaldehyde resin,
   II. — from 40 to 90 weight percent of an acrylate or methacrylate ester of an epoxidized fatty oil, said ester having vicinal hydroxyl groups and an average of at least two acrylate or methacrylate groups per mole thereof,
   III. — from 5 to 55 weight percent of a different hydroxyl-containing polyacrylate or polymethacrylate ester having an average of more than one functional acrylate or methacrylate group in the molecule,
   IV. — a catalytic amount of a condensation catalyst sufficient to catalyze the condensation polymerization, and
   V. — from 0 to 20 weight percent of a photoinitiator;
   said liquid or paste composition having a viscosity of from W to greater than Z on the Gardner-Holdt Scale.

2. A composition as claimed in claim 1 wherein (I) is present at a concentration of from 10 to 25 weight percent.

3. A composition as claimed in claim 1 wherein (II) is present at a concentration of from 50 to 80 weight percent.

4. A composition as claimed in claim 1 wherein (III) is present at a concentration of from 10 to 40 weight percent.

5. A composition as claimed in claim 1 wherein (I) is hexamethoxymethyl melamine.

6. A composition as claimed in claim 1 wherein (II) is the acrylate ester of epoxidized soybean oil.

7. A composition as claimed in claim 1 wherein (II) is the acrylate ester of epoxidized linseed oil.

8. A composition as claimed in claim 1 wherein (III) is a mixture of the acrylate esters of pentaerythritol having an average of 2.8 to 3.8 acrylate groups per mole.

9. A composition as claimed in claim 1 wherein (I) is hexamethoxymethyl melamine, (II) is the acrylate ester of epoxidized soybean oil, and (II) is pentaerythritol triacrylate.

10. A composition as claimed in claim 1 wherein (I) is hexamethoxymethyl melamine, (II) is the acrylate ester of epoxidized linseed oil, and (III) is pentaerythritol triacrylate.

* * * * *